Nov. 16, 1971  J. DRILLER  3,619,909

DEVICE FOR THE DETACHMENT OF BUILT-UP GRANULAR MASS

Filed Sept. 23, 1969

INVENTOR
JOSEF DRILLER
ATTORNEY

United States Patent Office 3,619,909
Patented Nov. 16, 1971

3,619,909
DEVICE FOR THE DETACHMENT OF BUILT-UP GRANULAR MASS
Josef Driller, Dortmund-Loh, Germany, assignor to Friedrich Uhde G.m.b.H., Dortmund, Germany
Filed Sept. 23, 1969, Ser. No. 860,229
Claims priority, application Germany, Oct. 19, 1968, P 18 04 144.6
Int. Cl. F26b 9/00
U.S. Cl. 34—164                                2 Claims

ABSTRACT OF THE DISCLOSURE

A device to exclude any build-up in a steeply inclined feed chute or prevent the growing of the material layer beyond inadmissable limits by vibrating the chute lined with adhesion-retarding material, in a longitudinal direction and protecting the chute from the hot drying gas stream by means of a heat-shielding plate and/or a cooling device.

BACKGROUND OF THE INVENTION

The manufacture of synthetic fertilizer involves the transfer of wet product, such as granulated material, from mixing or granulating facilities into downstream equipment. As this wet material is generally plastic and hot, it cannot be transported on a horizontal plane because the caking of the material on the conveying equipment is unavoidable. In general, the material featuring a build-up tendency is allowed to drop through steeply inclined feed chutes into the drying equipment. This method makes the impact of the material upon the feed chute unavoidable.

As a result of this impact, part of the material will stick to the feed chute. On account of the properties described above and depending on the tendency to caking, the layer of material sticking to the feed chute will reach at the feed point, within 10 to 30 minutes, a thickness that requires manual removal of material from the feed chute. Removal of material at the feed point can yet be performed during operation of the plant because this point is easily accessible. Additional plant personnel is needed to ensure permanent supervision of the feed point. Build-up of material or broken granules proceeds more slowly along the feed chute. For cleaning the feed chute, the plant must be shut down which means a loss of production.

When the drying fluid, for example hot air, is or must be introduced also at the chute end of the drum, the tendency of the material to caking will be still more acute.

None of the methods heretofore applied has given entirely satisfactory results for handling the various kinds of fertilizer or other moist granular material. Additional personnel is still needed, and production losses are encountered.

SUMMARY OF THE INVENTION

The device according to the present invention is intended either to exclude any build-up of material or to prevent the growing of the material layer beyond inadmissible limits.

It has been found that the growing of a material layer can be limited when the feed chute is excited by means of a vibrator to perform vibrations in a longitudinal direction so that mass inertia will exceed the power of adhesion of the material, that means sticking material will work loose.

In order to be able to adapt conditions to the build-up tendency of the material or granular mass of different moisture content and to vary the thickness of built-up material layer, the vibrator can be regulated to modify the amplitude of vibrations.

DESCRIPTION OF THE PREFERRED EMBODIMENT

Figure 1:
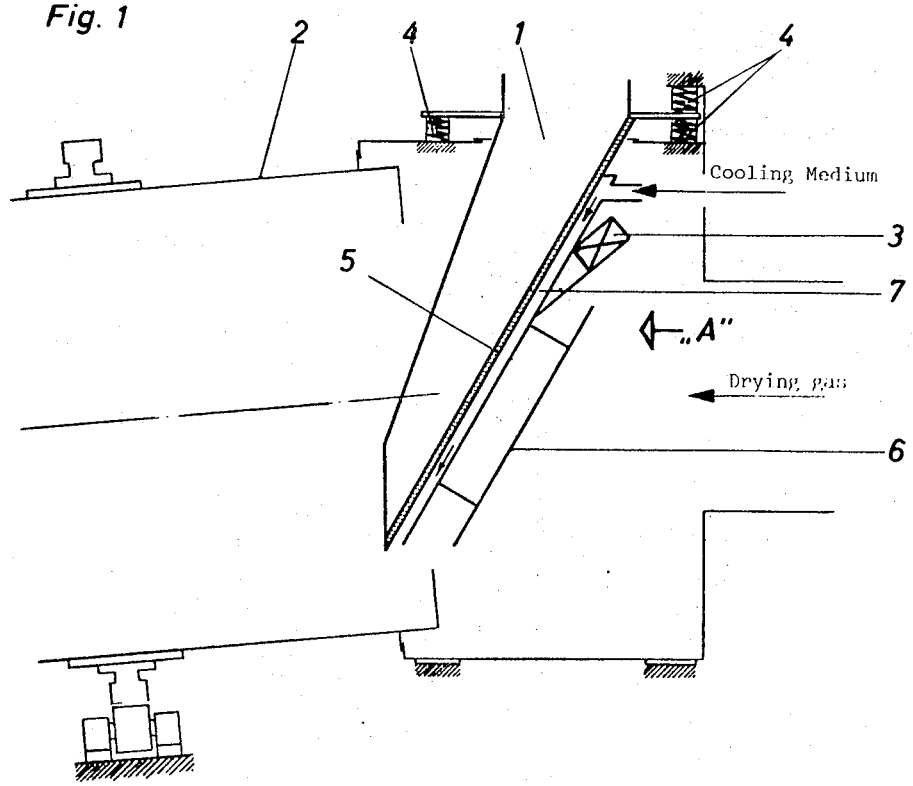
FIG. 1 is a schematic view of apparatus for facilitating the movement of granular mass.
Figure 2:
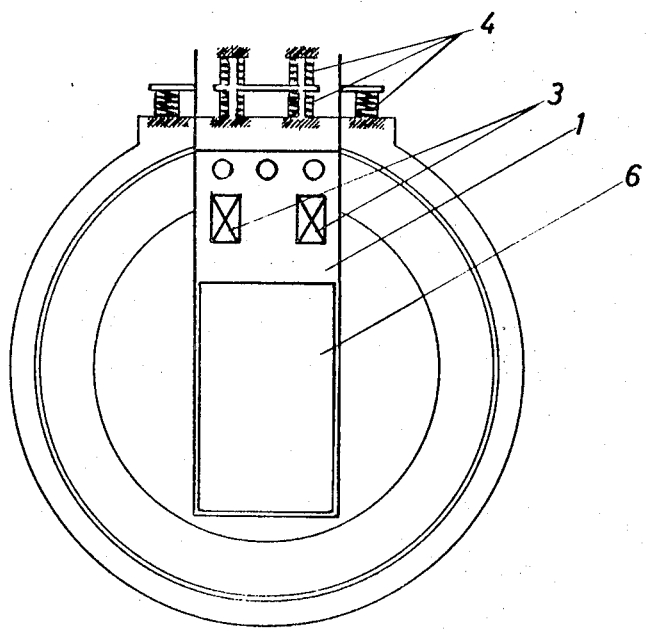
FIG. 2 is a view in the direction of the arrow A shown on FIG. 1.

A feed chute 1, through which the material passes into a drying drum 2 is excited either continuously or recurrently by means of a vibrator 3 to perform vibrations in a substantially longitudinal direction. According to the present invention, the vibrator 3 is fixed to the feed chute 1 in such a way that vibrations are induced at an angle of 5 to 15°, preferably 8 to 12°, towards the plane of the feed chute. The feed chute is supported by resilient elements 4, such as coil springs. The feed chute may be provided with a suitable lining 5 of adhesion-retarding material, such as rubber or Teflon, and protected from the impact of hot drying gas by a heat shielding plate 6 and/or a cooling device 7. The cooling device 7 may be in the form of a duct through which a suitable coolant flows.

The design of the feed chute assembly according to the present invention prevents an inadmissible build-up of material and, in addition, production losses. Consequently, plant economy will increase substantially.

If the granular mass emanating from the granulating device is a hot and moist material that requires no drying but must be cooled for crystallization, use is made of cooling air instead of drying gas, and the heat-shielding plate 6 is omitted. The cooling device 7 is then not needed.

What I claim is:

1. In a device of the class described, a steeply inclined feed chute for introducing material having a tendency to build up into drying or cooling equipment, means for vibrating said chute in a longitudinal direction, said feed chute being disposed in the path of a drying gas stream, and a shielding plate for the portion of said chute exposed to the gas stream.

2. In a device of the class described, a steeply inclined feed chute for introducing material having a tendency to build up into drying or cooling equipment, means for vibrating said chute in a longitudinal direction, said feed chute being disposed in the path of a drying gas stream, and means for cooling the portion of the chute exposed to the gas stream.

References Cited

UNITED STATES PATENTS 2,674,445   4/1954   Diehl _____ 263—21 X
3,116,124  12/1963   Eulkin _____ 34—122

EDWARD G. FAVORS, Primary Examiner

U.S. Cl. X.R.

193—10